(12) United States Patent
Hou et al.

(10) Patent No.: US 11,410,342 B2
(45) Date of Patent: Aug. 9, 2022

(54) METHOD FOR ADDING SPECIAL EFFECT TO VIDEO, ELECTRONIC DEVICE AND STORAGE MEDIUM

(71) Applicant: BEIJING DAJIA INTERNET INFORMATION TECHNOLOGY CO., LTD., Beijing (CN)

(72) Inventors: Peihong Hou, Beijing (CN); Zhichao Liang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 73 days.

(21) Appl. No.: 17/073,472

(22) Filed: Oct. 19, 2020

(65) Prior Publication Data

US 2021/0158577 A1    May 27, 2021

(30) Foreign Application Priority Data

Nov. 21, 2019 (CN) .......................... 201911150797.2

(51) Int. Cl.
   *G06T 7/194*    (2017.01)
   *G06T 7/13*     (2017.01)
   *G06T 11/00*    (2006.01)
   *G06V 40/16*    (2022.01)

(52) U.S. Cl.
   CPC ............ *G06T 11/00* (2013.01); *G06T 7/13* (2017.01); *G06T 7/194* (2017.01); *G06V 40/165* (2022.01); *G06V 40/171* (2022.01); *G06T 2207/10016* (2013.01)

(58) Field of Classification Search
   None
   See application file for complete search history.

(56) References Cited

U.S. PATENT DOCUMENTS

2018/0075524 A1* 3/2018 Sartori Odizzio .. G06F 3/04845
2019/0370593 A1* 12/2019 Nakao .................... G06V 20/20

OTHER PUBLICATIONS

Notice of Allowance for CN application 201911150797.2 with English Translation.

* cited by examiner

*Primary Examiner* — Kyle Zhai
(74) *Attorney, Agent, or Firm* — Timothy W. Menasco, Esq.; Harter Secrest & Emery LLP

(57) ABSTRACT

Embodiments of the present disclosure provide a method for adding a special effect to a video, an electronic device and a storage medium. First portrait edge information of a first frame is determined based on the portrait foregrounds of the first frame and a previous frame. A fluctuation offset based on a playback time and a fluctuation parameter is added to the first portrait edge information to obtain second portrait edge information. The second portrait edge information is superimposed on the first frame to obtain a second frame having the special effect.

20 Claims, 13 Drawing Sheets

METHOD FOR ADDING SPECIAL EFFECT TO VIDEO, ELECTRONIC DEVICE AND STORAGE MEDIUM

CROSS REFERENCE TO RELATED APPLICATIONS

This application is based on and claim priority under 35 U.S.C. 119 to CN Patent application No. 201911150797.2, filed on Nov. 21, 2019, in the China National Intellectual Property Administration, the disclosure of which is herein incorporated by reference in their entirety.

FIELD

The present disclosure relates to a field of video processing technologies, and more particularly, to a method and apparatus for adding a special effect to a video, an electronic device and a storage medium.

BACKGROUND

With the development of software and hardware technologies of smart phones, real-time rendering technology is becoming more and more widely used for mobile terminals.

SUMMARY

Embodiments of the present disclosure provides a method for adding a special effect to a video. The method includes: obtaining portrait foregrounds of frames contained in the video by separating the portrait foregrounds from backgrounds; determining first portrait edge information of a first frame based on the portrait foregrounds of the first frame and a previous frame; determining a fluctuation offset based on a playback time and a fluctuation parameter, in which the playback time is a time stamp of the first frame in the video; determining second portrait edge information by adding the fluctuation offset to the first portrait edge information; and obtaining a second frame with the special effect by superimposing the second portrait edge information and the first frame.

Embodiments of the present disclosure provides an electronic device. The electronic device includes a processor and a memory configured to store instructions executable by the processor. The processor is configured to the execute the instructions to implement the method for adding the special effect to the video as described above.

Embodiments of the present disclosure provides a non-transitory computer readable storage medium. When instructions in the storage medium are executed by a processor of an electronic device, the processor is configured to implement the method for adding the special effect to the video as described above.

Embodiments of the present disclosure provides a computer program product. The computer program product includes readable program codes. When the readable program codes are executed by a processor of an electronic device, the processor is configured to implement the method for adding the special effect to the video as described above.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain principles of the present disclosure, rather than to limit the present disclosure.

DETAILED DESCRIPTION

In order to enable those skilled in the art to understand technical solutions of the present disclosure, descriptions will be made clearly and completely to technical solutions in the embodiments of the present disclosure in combination with accompanying drawings.

It should be noted that terms "first" and "second" in the description, claims and the accompanying drawings of the present disclosure are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following example embodiments do not represent all implementations consistent with the present disclosure; instead, the implementations described in the following example embodiments are merely examples of an apparatus and a method consistent with the attached claims and some aspects of the present disclosure.

With the development of software and hardware technologies of smart phones, real-time rendering technology is becoming more and more widely used for mobile terminals. In terms of special effects for videos, users are no longer satisfied with traditional special effects for videos, and hope that special effects for videos may be added on mobile phones.

In related arts, the rendering technology with special effects based on noise perturbation is mostly used in large-scaled computer games. As such a kind of rendering technology with special effects based on noise perturbation is of a huge calculation amount, it usually cannot be directly applied to mobile phones due to a limitation of performances of mobile phones.

Therefore, embodiments of the present disclosure provide a method and an apparatus for adding a special effect to a video, a related electronic device and a related storage medium, to at least solve a problem, existing in the related art, of a large calculation amount when adding the special effect to the video. The method and the apparatus for adding a special effect to a video, the related electronic device and the related storage medium will be described below.

Figure 1:
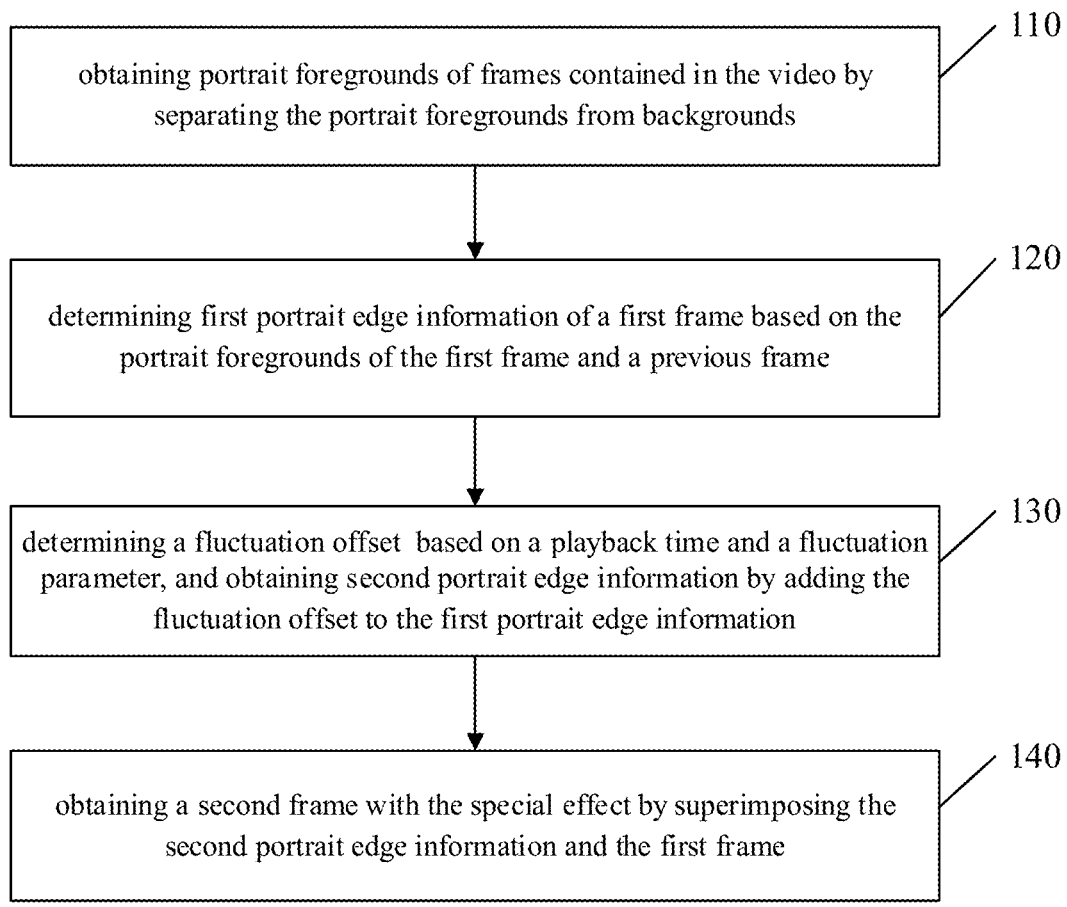
FIG. 1 is a flowchart illustrating a method for adding a special effect to a video according to an example embodiment.

FIG. 1 is a flowchart illustrating a method for adding a special effect to a video according to an example embodiment. As illustrated in FIG. 1, the method may include the following.

In block 110, portrait foregrounds of frames contained in the video are obtained by separating the portrait foregrounds from backgrounds.

In block 120, first portrait edge information of a first frame is determined based on the portrait foregrounds of the first frame and a previous frame.

In block 130, a fluctuation offset is determined based on a playback time and a fluctuation parameter. The playback time is a time stamp of the first frame in the video. Second portrait edge information is obtained by adding the fluctuation offset to the first portrait edge information.

In block 140, a second frame with the special effect is obtained by superimposing the second portrait edge information and the first frame.

Embodiments of the present disclosure may be described in detail as follows.

Figure 2:
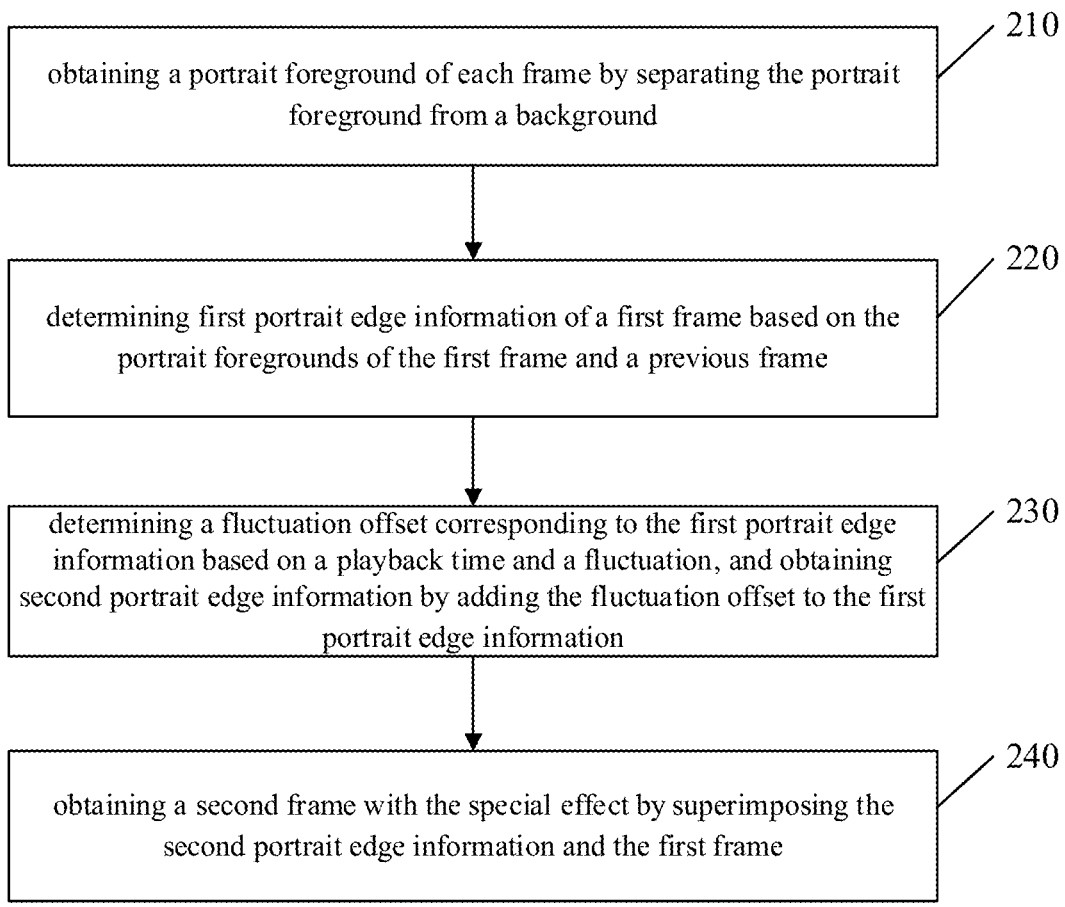
FIG. 2 is a flowchart illustrating a method for adding a special effect to a video according to an example embodiment.

FIG. 2 is a flowchart illustrating a method for adding a special effect to a video according to an example embodiment. As illustrated in FIG. 2, the method for adding the special effect to the video may be applied to an electronic device, such as a mobile phone, and may include the following.

In block 210, for each frame contained in a video to be added with a special effect, the portrait foreground of the frame is obtained by separating the portrait foreground from a background.

The video to be added with the special effect may be obtained by a camera, or may be obtained from a storage location specified by a user. The video to be added with the special effect may be a video related to humans. The present disclosure is to add a special effect to portrait edges.

Figure 3A:
FIG. 3a is a diagram illustrating a picture before segmenting a portrait foreground from a background according to the present disclosure.
Figure 3B:
FIG. 3b is a diagram illustrating a picture of a portrait foreground obtained after segmenting a portrait foreground from a background according to the present disclosure.

A first frame may be determined based on an order of frames contained in the video. After the first frame is determined, the portrait foreground is separated from the background for the first frame by a foreground and background separation technology to obtain and save the portrait foreground of the first frame. FIG. 3a illustrates a picture before separating the portrait foreground from the background according to the present disclosure. FIG. 3b illustrates a picture of the portrait foreground obtained after separating the portrait foreground from the background according to the present disclosure. As illustrated in FIGS. 3a and 3b, the foreground and background of the picture illustrated in FIG. 3a may be separated to obtain the portrait foreground as illustrated in FIG. 3b.

In block 220, first portrait edge information of the first frame is determined based on the portrait foreground of the first frame and the portrait foreground of a previous frame.

Figure 4A:
FIG. 4a is a schematic diagram illustrating a first frame according to the present disclosure.
Figure 4B:
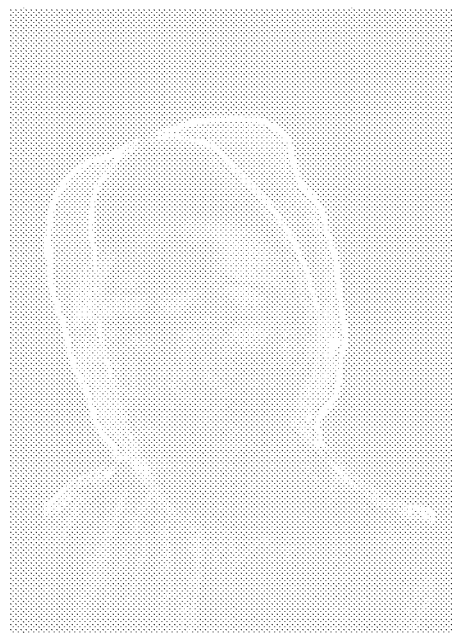
FIG. 4b is a schematic diagram illustrating first portrait edge information of the first frame obtained after performing time-varying segmentation according to the present disclosure.

The first portrait edge information of the first frame may be determined in a manner of time-varying segmentation. That is, the portrait foreground of the first frame and the portrait foreground of the previous frame are converted into grayscale images respectively. After the grayscale images are obtained, a subtraction operation is performed on gray values corresponding to the portrait foreground of the first frame and gray values corresponding to the portrait foreground of the previous frame to obtain differences. Absolute values of the differences are obtained and determined as the first portrait edge information of the first frame. FIG. 4a is a schematic diagram illustrating the first frame according to the present disclosure. FIG. 4b is a schematic diagram illustrating the first portrait edge information of the first frame obtained by the time-varying segmentation according to the present disclosure. In other words, by performing the time-varying segmentation on the first frame illustrated as FIG. 4a, the first portrait edge information as illustrated in FIG. 4b is obtained.

During the time-varying segmentation, the portrait foreground of the previous frame is required. Therefore, a queue may be used to save obtained portrait foreground of each frame. When the time-varying segmentation is performed, the portrait foreground of the previous frame is taken out from the queue. The time-varying segmentation is performed based on the portrait foreground of the first frame and the portrait foreground of the previous frame to obtain the first portrait edge information corresponding to the first frame.

It should be noted that in addition to the time-varying segmentation, the first portrait edge information may be extracted by an edge extraction technology. With the edge extraction technology, static images may be rendered by adding light effects. However, as algorithms of the edge extraction technology are complex, requirements on performances of the electronic device are high.

In block 230, a fluctuation offset corresponding to the first portrait edge information is determined based on a playback time and a fluctuation parameter. The playback time is a time stamp of the first frame in the video to be added with the special effect. The fluctuation parameter is determined in advance. Second portrait edge information is obtained by adding the fluctuation offset to the first portrait edge information.

The fluctuation is generated by a vibration at one point. For example, the vibration on an origin is y=f(t), which propagates along a positive direction of the x-axis at a speed v. A vibration equation on the position x at time t is $$y = f\left(t - \frac{x}{v}\right).$$

The vibration equation is commonly a simple harmonic vibration f(t)=A sin(ωt), such that the wave function is $$y(x, t) = f\left(t - \frac{x}{v}\right) = A\sin\left(\omega\left(t - \frac{x}{v}\right)\right) = A\sin(\omega t - kx), k = \frac{\omega}{v}.$$

This one-dimensional wave function may be written as $$f\left(t - \frac{x}{v}\right) = A\sin\left(\omega t - \frac{\omega}{v}x\right),$$

where A represents vibration intensity (i.e., a maximum intensity of the fluctuation), t represents time, x represents displacement, ω and v respectively represent frequency factor and propagation speed, that is, a vibration speed of the wave and a propagation speed of the wave.

It may be seen that the intensity of the one-dimensional fluctuation is related to both the displacement x and the time t. By analogy, the intensity of a two-dimensional fluctuation is related to the displacements x and y, as well as the time t. Therefore, the present disclosure is based on the principle of propagation and superimposition of waves. Random noises are added to simulate natural fluctuations in the present disclosure. The fluctuation offset corresponding to each pixel contained in the first portrait edge information are determined based on the playback time and the fluctuation parameter. A pixel value corresponding to the pixel is assigned for a corresponding offset pixel.

In block 240, a second frame with the special effect is obtained by superimposing the second portrait edge information and the first frame.

After the special effect for the video is added to the first portrait edge information to obtain the second portrait edge information, the second frame having the special effect of a fluctuated portrait edge is obtained by superimposing the second portrait edge information and the first frame of the video.

According to the method for adding the special effect to the video according to the example embodiments, the portrait foreground is obtained by separating the portrait foreground from the background for each frame. The first portrait edge information of the first frame is determined based on the portrait foreground of the first frame and the portrait foreground of the previous frame. The fluctuation offset is determined based on the playback time and the fluctuation parameter. The second portrait edge information is obtained by adding the fluctuation offset to the first portrait edge information. The second frame having the special effect is obtained by superimposing the second portrait edge information to the first frame. Instead of adding the special effect based on noise perturbation, the principle of propagation of waves is used to add the fluctuation offsets to the first portrait edge information, thereby reducing calculation amounts, and being applicable to mobile terminals, such as mobile phones.

On the basis of the above technical solution, determining the fluctuation offset corresponding to the first portrait edge information based on the playback time and the fluctuation parameter includes the following. For each pixel contained in the first portrait edge information, based on the playback time, a preset amplitude factor, a preset temporal frequency factor and a preset spatial coordinate factor, the fluctuation offset corresponding to the pixel contained in the first portrait edge information is determined according to formulas of:

$$\Delta x = A(\sin(\omega t)\sin(kx) + \cos(\omega t)\sin(ky)),$$

$$\Delta y = A(\sin(\omega t)\sin(ky) + \cos(\omega t)\sin(kx)),$$

where A represents the preset amplitude factor, ω represents the preset temporal frequency factor, k represents the preset spatial coordinate factor, t represents the playback time, x represents an abscissa of the pixel, y represents an ordinate of the pixel, Δx represents the fluctuation offset of the abscissa of the pixel, and Δy represents the fluctuation offset of the ordinate of the pixel.

In nature, the wave propagates randomly. In order to increase this randomness of the special effect of fluctuation, the two-dimensional fluctuation is not a sine wave or cosine wave having a certain regulation, when extending the one-dimensional fluctuation to the two-dimensional fluctuation. The fluctuation offset may be determined according to the above formulas to enable the wave to propagate randomly and to increase the randomness of the special effect of fluctuation. By determining the fluctuation offset based on the playback time and the position of each pixel, the light effect of fluctuation is changing to realize dynamically changing of the special effect.

Figure 5:
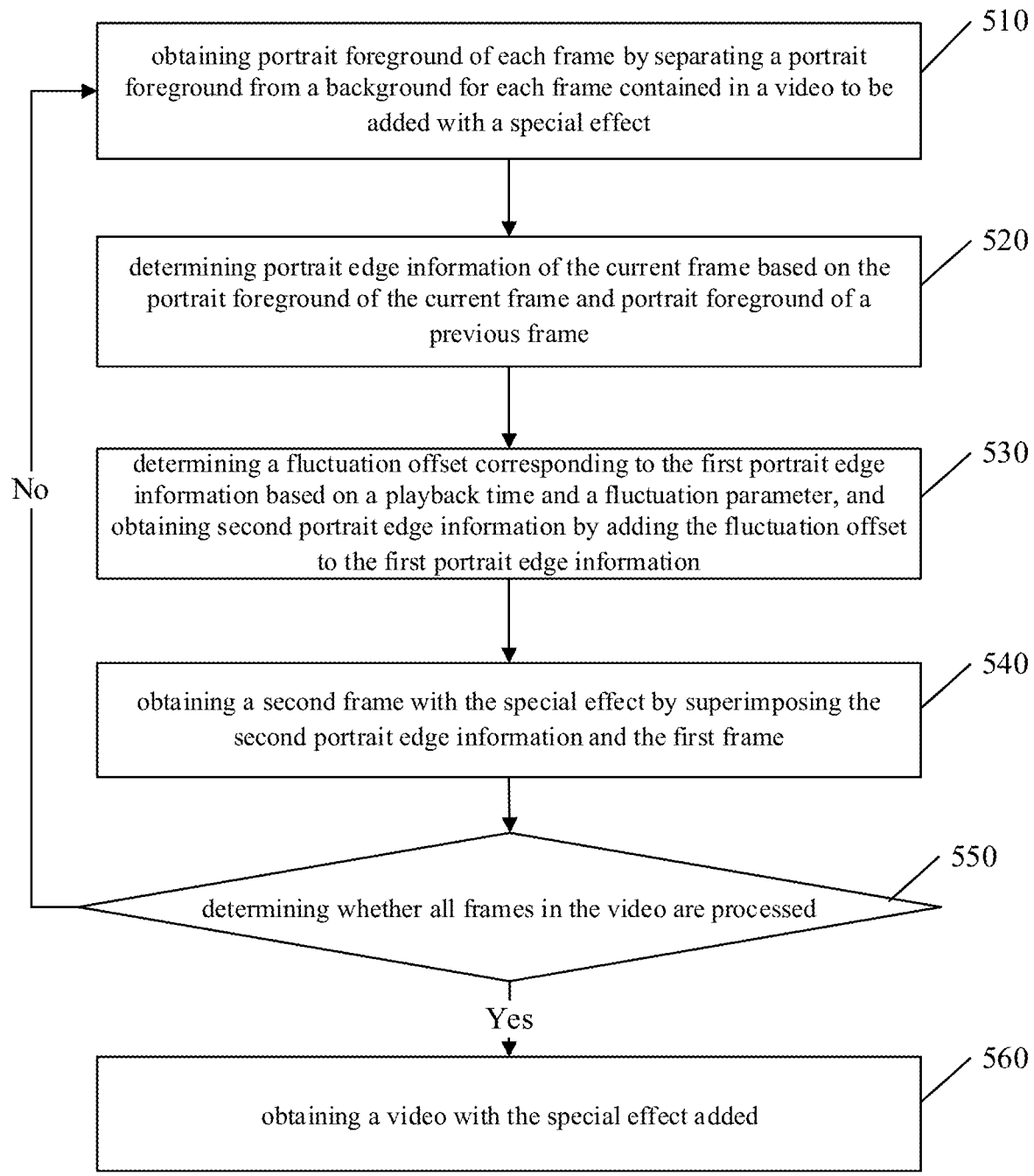
FIG. 5 is a flowchart illustrating a method for adding a special effect to a video according to an example embodiment.

FIG. 5 is a flowchart illustrating a method for adding a special effect to a video according to an example embodiment. As illustrated in FIG. 5, the method for adding the special effect to the video may be applied to an electronic device, such as a mobile phone, and may include the following.

In block 510, the portrait foreground of each frame is obtained by separating the portrait foreground a background for each frame contained in a video to be added with a special effect.

In block 520, first portrait edge information of the first frame is determined based on the portrait foregrounds of the first frame and a previous frame.

In block 530, a fluctuation offset corresponding to the first portrait edge information is determined based on a playback time and a fluctuation parameter. Second portrait edge information is obtained by adding the fluctuation offset to the first portrait edge information. The playback time is a time stamp of the first frame in the video. The fluctuation parameter is determined in advance.

In block 540, a second frame with the special effect is obtained by superimposing the second portrait edge information and the first frame contained in the video.

In block 550, it is determined whether all frames contained in the video are processed. In response to determining that all frames contained in the video are processed, a block 560 is executed. In response to determining that not all frames contained in the video are processed, the block 510 is executed.

It is determined whether all the frames contained in the video are added with the special effect. If some of the frames are not added with the special effect yet, the special effect is added to each of these frames in accordance with blocks 510 to 550, until all frames are processed.

In block 560, a video added with the special effect is obtained.

According to the method for adding the special effect to the video according to the example embodiments, the portrait foreground is separated from the background for the first frame contained in the video to obtain the portrait foreground of the first frame. The first portrait edge information of the first frame is determined based on the portrait foreground of the first frame and the portrait foreground of the previous frame. The fluctuation offset corresponding to the first portrait edge information is determined based on the playback time and the fluctuation parameter, and the fluctuation offset is added to the first portrait edge information to obtain second portrait edge information. The second portrait edge information is superimposed to the first frame to obtain the second frame with the special effect. Operations of adding the special effect to the first frame are performed circularly until all frames contained in the video are processed to obtain the video added with the special effect. Instead of adding the special effect based on noise perturbation, the principle of propagation of waves is used to add the fluctuation offset to the first portrait edge information, thereby reducing calculation amounts, and being applicable to mobile terminals, such as mobile phones.

Figure 6:
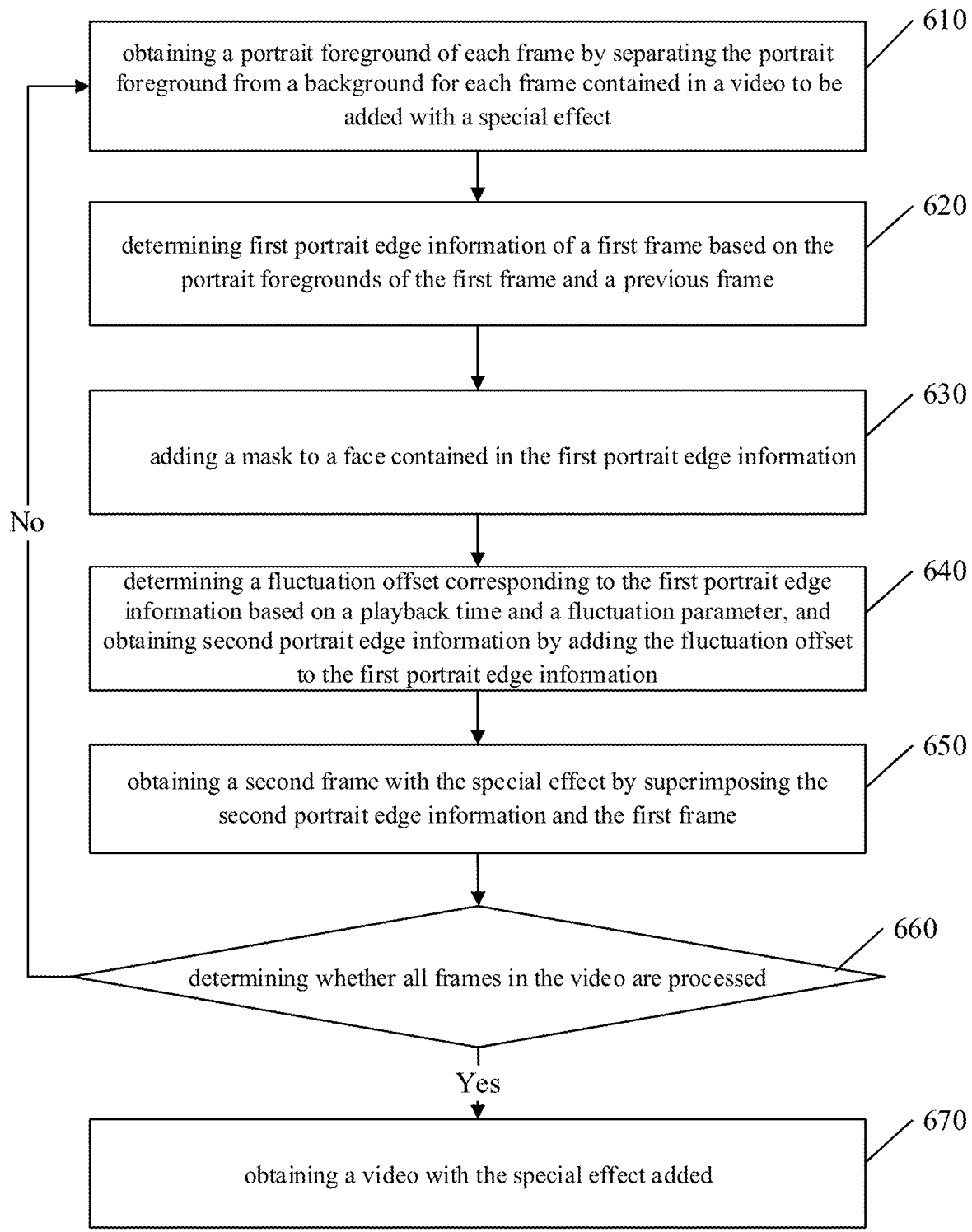
FIG. 6 is a flowchart illustrating a method for adding a special effect to a video according to an example embodiment.

FIG. 6 is a flowchart illustrating a method for adding a special effect to a video according to an example embodiment. As illustrated in FIG. 6, the method for adding the special effect to the video may be applied to an electronic device, such as a mobile phone, and may include the following.

In block 610, a portrait foreground of each frame is obtained by separating the portrait foreground from a background for each frame contained in a video to be added with a special effect.

In block 620, first portrait edge information of a first frame is determined based on the portrait foreground of the first frame and a portrait foreground of a previous frame.

In block 630, a mask is added to a face contained in the first portrait edge information.

The mask may be a binary image composed of values of 0 and 1. When the mask is applied, an area masked by the value of 1 is processed, and an area masked by the value of 0 is not processed or calculated.

The face contains a large amount of detailed information, such that it is undesirable to add too much special effects to the face as too much special effects may lead to the face unclear. Therefore, adding the mask to a facial area may prevent the special effect from being applied to the face. Through face recognition, a position of the face in the portrait foreground is determined. Based on the position of the face, the mask is added to the face contained in the first portrait edge information, to avoid adding the special effect to the face subsequently.

In an implementation, adding the mask to the face contained in the first portrait edge information includes the following. A center point of the face is determined by performing face recognition on the portrait foreground. An attenuation matrix is determined as the mask based on a distance from each pixel contained in the first portrait foreground to the center point of the face. Third portrait edge information is obtained by multiplying the attenuation matrix and the first portrait edge information. The third portrait edge information is added with a facial mask.

Face detection is adopted to detect key points of the face contained in the portrait foreground. The center point of the face is determined based on the key points of the face. With the center point of the face, the attenuation matrix is determined as the mask. In the attenuation matrix, attenuation values are attenuated based on the distance from each pixel contained in the portrait foreground to the center point of the face. The attenuation matrix is multiplied by the first portrait edge information (meaning that the mask is added to the first portrait edge information) to obtain the third portrait edge information having the facial mask. Consequently, when the special effect is to be added subsequently, based on the third portrait edge information, it may be avoided adding the special effect to the face. In addition, the attenuation matrix may be adjusted based on the size of the face, such that the attenuation matrix may cover the whole face.

In an implementation, performing the face recognition on the portrait foreground to determine the center point of the face includes the following. Centers of eyes are determined by performing the face recognition on the portrait foreground. A midpoint of a connecting line between the centers of the eyes is determined as the center point of the face.

The face recognition may be performed on the portrait foreground through a face detection algorithm to obtain key points of the face. The centers of the eyes may be determined based on the key points of the face. The midpoint of the connecting line between the centers of the eyes is determined as the center point of the face. Determining the center point of the face in this manner may increase the calculation speed.

In an implementation, determining the attenuation matrix as the mask based on the distance from each pixel contained in the portrait foreground to the center point of the face includes the following. The attenuation matrix is determined as the mask based on the distance from each pixel contained in the portrait foreground to the center point of the face according to a following formula:

$$C(x,y)=e^{-\alpha L},$$

where (x,y) represents a coordinate of a pixel contained in the portrait foreground, C(x,y) represents an attenuation value contained in the attenuation matrix corresponding to the coordinate (x,y), L represents a distance from a point having the coordinate (x,y) to the center point of the face, and α represents a preset attenuation coefficient.

Figure 7A:
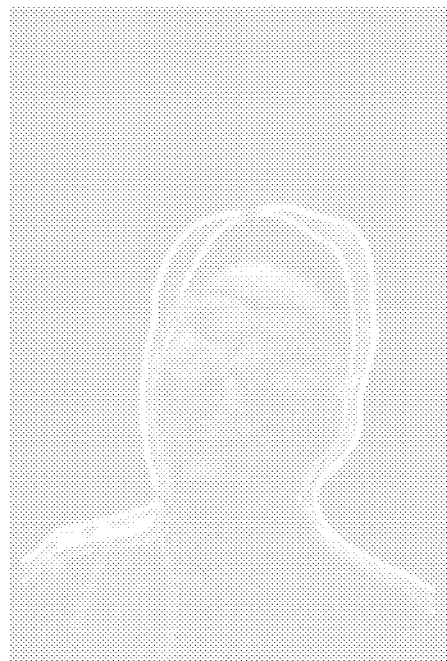
FIG. 7a is a schematic diagram illustrating first portrait edge information according to the present disclosure.
Figure 7B:
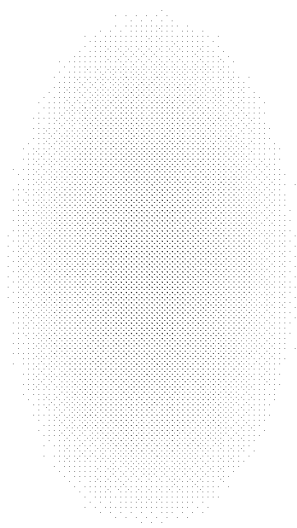
FIG. 7b is a schematic diagram illustrating third portrait edge information having a mask according to the present disclosure.
Figure 7C:
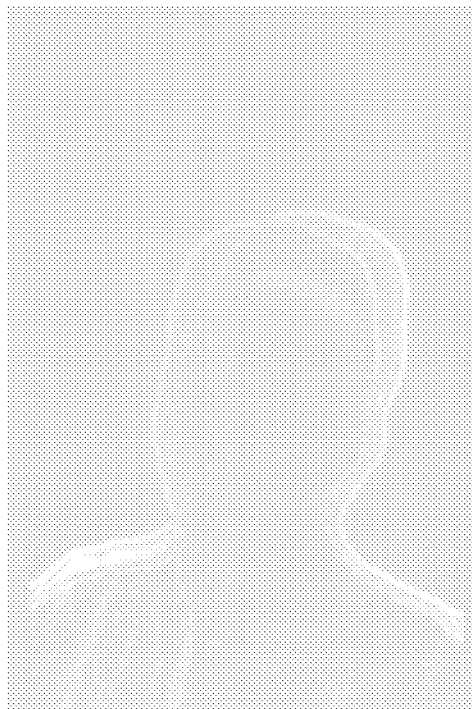
FIG. 7c is a schematic diagram illustrated third portrait edge information with an added mask according to the present disclosure.

For example, the coordinate of the center point of the face is $A(x_0,y_0)$. That is, the coordinate of the center point of the face contained in the first portrait edge information is also $A(x_0, y_0)$. The distance from each pixel B(x,y) contained in the first portrait edge information to the center point of the face $A(x_0, y_0)$ is: L=|A−B|. The attenuation matrix may be determined for the first portrait edge information illustrated in FIG. 7a through the above formula. The obtained mask corresponding to the attenuation matrix is illustrated as FIG. 7b. The attenuation matrix is multiplied by the first portrait edge information illustrated in FIG. 7a to obtain an image of the edge information with an attenuated face, that is, the third portrait edge information (as illustrated in FIG. 7c) with the facial mask.

In block 640, a fluctuation offset corresponding to the first portrait edge information is determined based on a playback time and a fluctuation parameter, and second portrait edge information is obtained by adding the fluctuation offset to the first portrait edge information. The playback time is a time stamp of the first current in the video. The fluctuation parameter is determined in advance.

In block 650, a second frame with the special effect is obtained by superimposing the second portrait edge information and the first frame.

In block 660, it is determined whether all frames contained in the video are processed. In response to determining that all frames contained in the video are processed, a block 670 is executed. In response to determining that not all frames contained in the video are processed, the block 610 is executed.

It is determined whether all the frames contained in the video are added with the special effect. If some of the frames are not added with the special effect yet, the special effect is added to each of these frames in accordance with block 610 to block 660, until all frames are processed.

In block 670, a video added with the special effect is obtained.

With the method for adding the special effect to the video according to the example embodiments, the mask is added to the face contained in the first portrait edge information before adding the special effect of fluctuation to the first portrait edge information, thereby avoiding adding the special effect to the face subsequently and weakening the special effect on the face.

Figure 8:
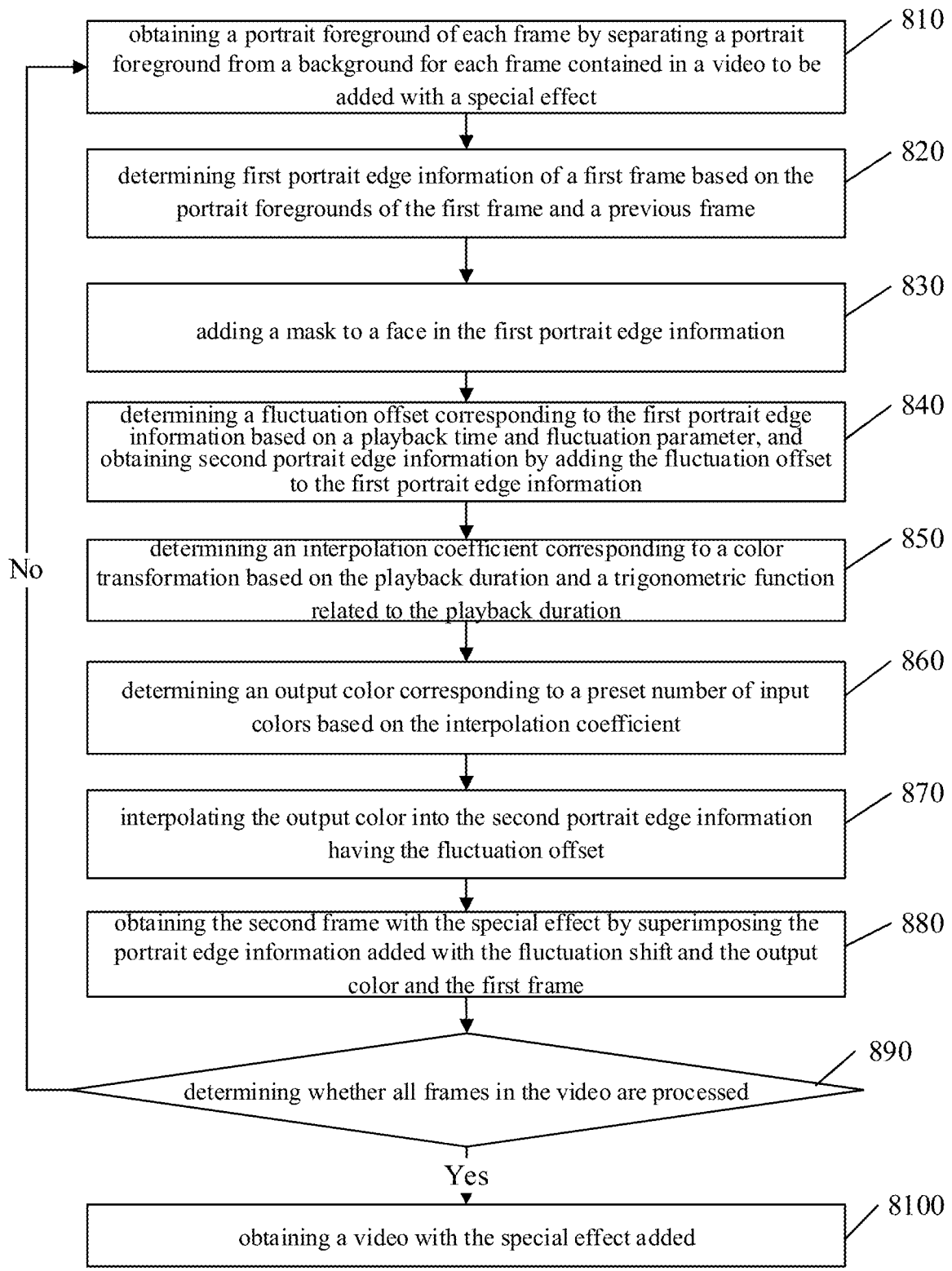
FIG. 8 is a flowchart illustrating a method for adding a special effect to a video according to an example embodiment.

FIG. 8 is a flowchart illustrating a method for adding a special effect to a video according to an example embodiment. As illustrated in FIG. 8, the method for adding the special effect to the video may be applied to an electronic device, such as a mobile phone, and may include the following.

In block 810, a portrait foreground of each frame is obtained by separating the portrait foreground from a background for each frame contained in a video to be added with a special effect.

In block 820, first portrait edge information of a first frame is determined based on the portrait foreground of the first frame and a portrait foreground of a previous frame.

In block 830, a mask is added to a face contained in the first portrait edge information.

In block 840, a fluctuation offset corresponding to the first portrait edge information is determined based on a playback time and a fluctuation parameter, and second portrait edge information is obtained by adding the fluctuation offset to the first portrait edge information. The playback time is a time stamp of the first frame in the video.

Figure 7D:
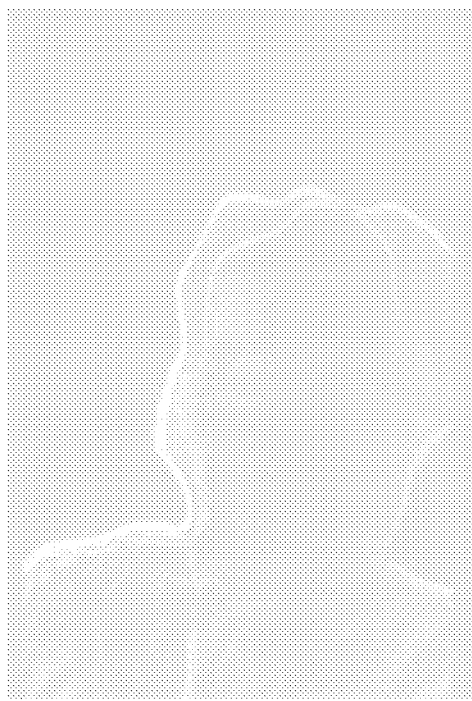
FIG. 7d is a schematic diagram illustrating second portrait edge information having a special effect of fluctuation according to the present disclosure.

FIG. 7d is a schematic diagram illustrating the second portrait edge information having the special effect of fluctuation according to the present disclosure. As illustrated in FIGS. 7c and 7d, FIG. 7c illustrates the third portrait edge information with the mask but without the special effect. After adding the special effect of fluctuation to the third portrait edge information illustrated in FIG. 7c, the effect illustrated in FIG. 7d is obtained, that is, the fluctuated portrait edge may be realized.

In block 850, an interpolation coefficient corresponding to color change is determined based on the playback time and a trigonometric function related to the playback time.

The special effect that the color of the portrait edge changes over time is added. The special effect of color change varies with time. Therefore, the trigonometric function related to the playback time may be determined as the interpolation coefficient corresponding to the color change.

In an implementation, determining the interpolation coefficient corresponding to the color change based on the playback time and the trigonometric function related to the playback time includes the following. The interpolation coefficient is determined based on the playback time and the trigonometric function related to the playback time according to the following formula:

$$r=\sin(vt),$$

where r represents the insertion coefficient, v represents a preset speed of the color change, and t represents the playback time.

Determining the trigonometric function related to the playback time as the interpolation coefficient corresponding to the color change may well reflect a regulation of the color change and may enhance the special effect.

In block 860, an output color corresponding to a preset number of input colors is determined based on the interpolation coefficient.

The input colors may be preset and the number of input colors may also be preset. For example, the preset number may be set to 3 and the input colors may be set as yellow, blue, and red. As another example, the preset number may be set to 2 and the input colors may be set as yellow and green. Other setting methods are also possible, and illustrations here are only exemplary. The setting method is not limited here.

In an implementation, the output color is determined based on the interpolation coefficient according to the following formula:

$$COL_{out}=[COL1*r+COL2*(1-r)]*r+COL3*(1-r),$$

where $COL_{out}$ represents the output color, and COL1, COL2 and COL3 are three input colors.

Three input colors are taken as an example to provide a specific manner to determine the output color in example embodiments.

In block 870, the output color is interpolated into the second portrait edge information having the fluctuation offset.

The output color is interpolated into the second portrait edge information by interpolation, to change the color of the special effect. When the special effect of color change is added, an effect of changing colors may be added on the basis of the second portrait edge information having the special effect of fluctuation, to further enhance the special effect.

Figure 7E:
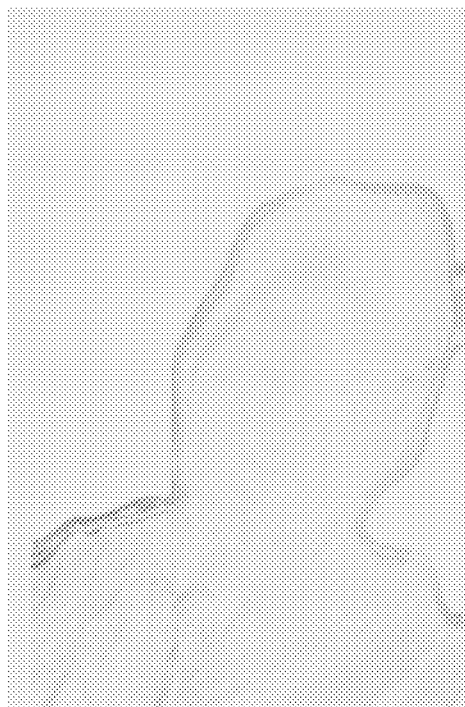
FIG. 7e is a schematic diagram illustrating portrait edge information added with color change according to the present disclosure.

For example, yellow (having an RGB value of 255, 215, 0), blue (having the RGB value of 64, 224, 208) and red (having the RGB value of 255, 99, 71) may be selected as the input colors. The special effect of color change may be added to the second portrait edge information having fluctuated edges illustrated in FIG. 7d to obtain the effect illustrated in FIG. 7e. FIG. 7e is a schematic diagram illustrating the portrait edge information having the special effect of color change according to the present disclosure.

In block 880, the portrait edge information having the fluctuation offset and the output color is superimposed on the first frame contained in the video to obtain the frame having the special effect.

In block 890, it is determined whether all frames contained in the video are processed. In response to determining that all frames contained in the video are processed, a block 8100 is executed. In response to determining that not all frames contained in the video are processed, the block 810 is executed.

It is determined whether all the frames contained in the video are added with the special effect. If some of frames are not added with the special effect yet, the special effect is added to each of these frames in accordance with block 810 to block 890, until all frames are processed.

In block 8100, a video added with the special effect is obtained.

With the method for adding the special effect to the video according to the example embodiments, the interpolation coefficient corresponding to the color change is determined based on the playback time and the trigonometric function related to the playback time. The output color corresponding to the preset number of the input colors is determined based on the interpolation coefficient. The output color is interpolated into the second portrait edge information. Consequently, the color of the special effect of the portrait edge may be changed, thereby enriching the special effect.

On the basis of the above technical solution, the method may also include the following. Fourth portrait edge information of the previous frame is obtained by performing, based on a preset color attenuation coefficient and a preset transparency attenuation coefficient, attenuation processing on color and transparency of the portrait edge information of the previous frame. The further portrait edge information of the previous frame is superimposed on the second portrait edge information.

An attenuation equation corresponding to color and transparency is:

$$U = U_0 e^{-\alpha T}, U_n/U_{n-1} = e^{-\alpha},$$

where $U_0$ represents an initial intensity of light effect, U represents an intensity of light effect at time T, $U_n$ represents an intensity of light effect of a $n^{th}$ frame contained in the video, $U_{n-1}$ represents an intensity of light effect of a $(n-1)^{th}$ frame contained in the video, and $\alpha$ represents an attenuation coefficient.

During the superimposing, the intensity of light effect of the previous frame is attenuated by the attenuation coefficient, and superimposed on the light effect of the first frame according to the following formula:

$$U_n = U_n + U_{n-1}$$

The above formula shows that a sum of the intensity of light effect of the $n^{th}$ frame and the attenuated intensity of light effect of the $(n-1)^{th}$ frame is determined as the intensity of light effect of the $n^{th}$ frame.

The color and the transparency of the light effect are respectively attenuated according to the above attenuation equation, i.e., $$\frac{RGB_n}{RGB_{n-1}} = e^{-a_1}, \frac{A_n}{A_{n-1}} = e^{-a_2},$$

where $RGB_n$ represents the color of the $n^{th}$ frame contained in the video, $RGB_{n-1}$ represents the color of the $(n-1)^{th}$ frame contained in the video, $a_1$ represents the preset color attenuation coefficient, $A_n$ represents the transparency of the $n^{th}$ frame contained in the video, $A_{n-1}$ represents the transparency of the $(n-1)^{th}$ frame contained in the video, and $a_2$ represents the preset transparency attenuation coefficient. The preset color attenuation coefficient and the preset transparency attenuation coefficient may be the same or different. For example, the preset color attenuation coefficient may be 0.8, and the preset transparency attenuation coefficient may be 0.6.

Figure 7F:
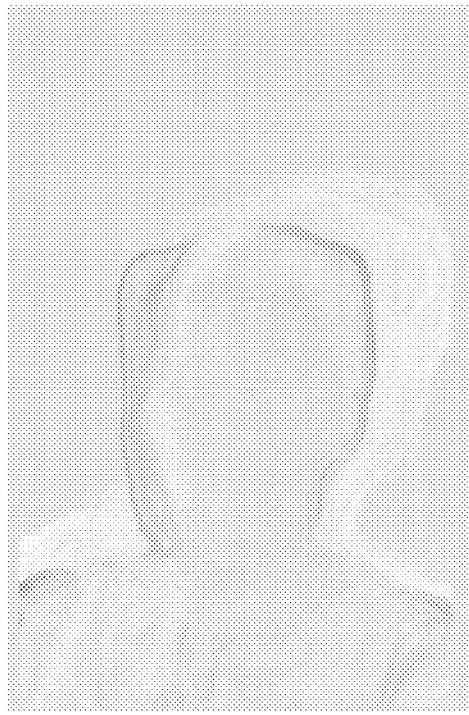
FIG. 7f is a schematic diagram illustrating portrait edge information added with dragging tail according to the present disclosure.
Figure 7G:
FIG. 7g is a schematic diagram illustrating a first frame obtained after adding processed portrait edge information according to the present disclosure.

After the color of the portrait edge information of the previous frame is attenuated based on the preset color attenuation coefficient and the transparency of the portrait edge information of the previous frame is attenuated based on the preset transparency attenuation coefficient to obtain the fourth portrait edge information of the previous frame, the fourth portrait edge information of the previous frame is superimposed on the second portrait edge information of the first frame, to obtain an effect of a dragging tail, thereby improving the special effect. FIG. 7f is a schematic diagram illustrating the portrait edge information added with a dragging tail according to the present disclosure. The dragging tail processing is performed on the portrait edge information added with the special effect of color change as illustrated in FIG. 7e to obtain the effect of dragging tail as illustrated in FIG. 7f. FIG. 7g is a schematic diagram illustrating an effect after adding a processed portrait edge information to a first frame according to the present disclosure. That is, FIG. 7g illustrates an effect obtained after adding the light effect obtained in FIG. 7f to the first frame, i.e., the effect includes the fluctuated light effect, the color change and the effect of dragging tail.

When the dragging tail processing is performed, the portrait edge information of the previous frame is required. Therefore, a queue may be used to save the portrait edge information of all frames. When the time-varying segmentation is performed, the portrait edge information of the previous frame is taken out from the queue. The color and transparency of the portrait edge information of the previous frame are attenuated respectively to obtain the fourth portrait edge information of the previous frame. The fourth portrait edge information of the previous frame is superimposed on the second portrait edge information of the first frame to obtain the dragging tail effect on the first frame.

Figure 9:
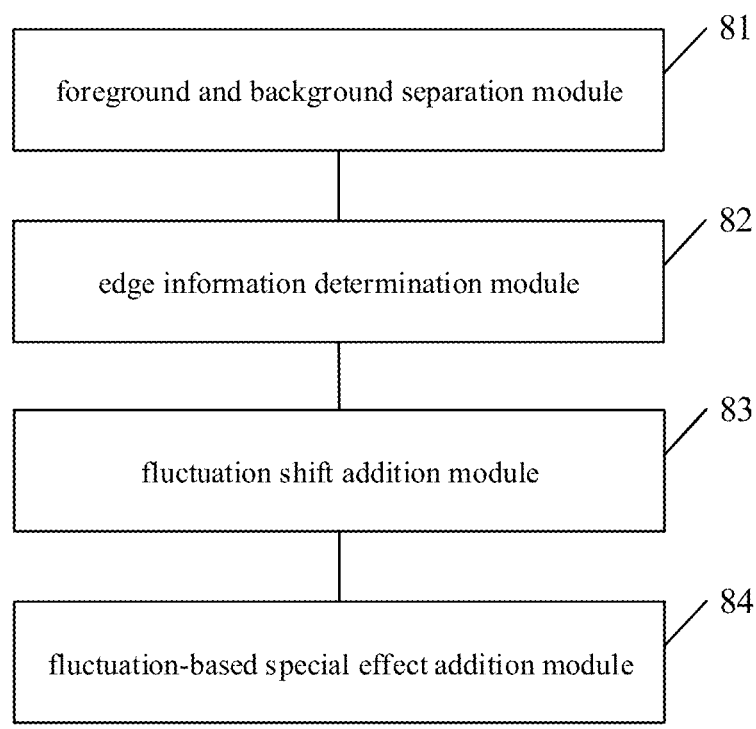
FIG. 9 is a block diagram illustrating an apparatus for adding a special effect to a video according to an example embodiment.

FIG. 9 is a block diagram illustrating an apparatus for adding a special effect to a video according to an example embodiment. As illustrated in FIG. 9, the apparatus may include a video obtaining module 81, a foreground and background separating module 82, an edge information determining module 83, a fluctuation offset adding module 84.

The foreground and background separating module 81 is configured to obtain a portrait foreground of each frame by separating a portrait foreground from a background for each frame in a video to be added with a special effect.

The edge information determining module 82 is configured to determine first portrait edge information of a first frame based on the portrait foreground of the first frame and the portrait foreground of a previous frame.

The fluctuation offset adding module 83 is configured to determine a fluctuation offset based on a playback time and a fluctuation parameter and obtain second portrait edge information by adding the fluctuation offset to the first portrait edge information. The playback time is a time stamp of the first frame in the video. The fluctuation offset corresponds to the first portrait edge information. The fluctuation offset is determined in advance.

The fluctuation special effect adding module 84 is configured to obtain a second frame having the special effect by superimposing the second portrait edge information and the first frame.

In some examples, the apparatus may further include a mask adding module configured to add a mask to a face contained in the first portrait edge information.

In an example, the mask adding module may include a midpoint determining unit, an attenuation matrix determining unit and a mask adding unit.

The midpoint determining unit is configured to determine a center point of the face by performing face recognition on the portrait foreground.

The attenuation matrix determining unit is configured to determine an attenuation matrix as the mask based on a distance from each pixel contained in the portrait foreground to the center point of the face.

The mask adding unit is configured to obtain third portrait edge information having a facial mask by multiplying the attenuation matrix and the first portrait edge information.

In an example, the midpoint determining unit is configured to: determine centers of the eyes by performing face recognition on the portrait foreground; and determine a midpoint of a connecting line between the centers of the eyes as the center point of the face.

In an example, the attenuation matrix determining unit is configured to determine the attenuation matrix as the mask based on the distance from each pixel contained in the portrait foreground to the center point of the face according to the following formula:

$$C(x,y)=e^{-\alpha L},$$

where (x,y) represents a coordinate of a pixel contained in the portrait foreground, C(x,y) represents an attenuation value contained in the attenuation matrix corresponding to the coordinate (x,y), L represents a distance from a point having the coordinate (x,y) to the center point of the face, and α represents a preset attenuation coefficient.

In an example, the fluctuation offset adding module includes a fluctuation offset determining unit. The fluctuation offset determining unit is configured to determine, based on the playback time, a preset amplitude factor, a preset temporal frequency factor and a preset spatial coordinate factor, for each pixel contained in the portrait edge information, a fluctuation offset corresponding to the pixel contained in the first portrait edge information according to the following formulas:

$$\Delta x = A(\sin(\omega t)\sin(kx)+\cos(\omega t)\sin(ky)),$$

$$\Delta y = A(\sin(\omega t)\sin(ky)+\cos(\omega t)\sin(kx)),$$

where A represents the preset amplitude factor, ω represents the preset temporal frequency factor, k represents the preset spatial coordinate factor, t represents the playback time, x represents an abscissa of the pixel, y represents an ordinate of the pixel, Δx represents the fluctuation offset of the abscissa of the pixel, and Δy represents a fluctuation offset of the ordinate of the pixel.

In an example, the apparatus may further include an interpolation coefficient determining module, an output color determining module and a color interpolating module.

The interpolation coefficient determining module is configured to determine an interpolation coefficient corresponding to color change based on the playback time and a trigonometric function related to the playback time.

The output color determining module is configured to determine an output color corresponding to a preset number of input colors based on the interpolation coefficient.

The color interpolating module is configured to interpolate the output color into the second portrait edge information having the fluctuation offset.

In an example, the interpolation coefficient determining module is configured to determine, based on the playback time and the trigonometric function related to the playback time, the interpolation coefficient according to the following formula:

$$r=\sin(vt),$$

where r represents the interpolation coefficient, v represents a preset speed of the color change, and t represents the playback time.

The output color determining module is configured to determine, based on the interpolation coefficient, the output color corresponding to the preset number of input colors according to the following formula:

$$COL_{out}=[COL1*r+COL2*(1-r)]*r+COL3*(1-r),$$

where $COL_{out}$ represents the output color, and COL1, COL2 and COL3 are three input colors.

In an example, the apparatus may further include a dragging tail adding module.

The dragging tail adding module is configured to obtain fourth portrait edge information of the previous frame by performing, based on a preset color attenuation coefficient and a preset transparency attenuation coefficient, attenuation processing on color and transparency of the portrait edge information of the previous frame, and to superimpose the fourth portrait edge information of the previous frame on the second portrait edge information of the first frame.

In an example, the apparatus may further include a loop control module.

The loop control module is configured to perform operations of adding the special effect to the first frame circularly until all frames contained in the video are processed to obtain the video added with the special effect.

Regarding the apparatus according to the foregoing embodiments, the specific manner in which each module performs operations has been described in detail in embodiments of a related method, and thus detailed description will not be given here.

Figure 10:
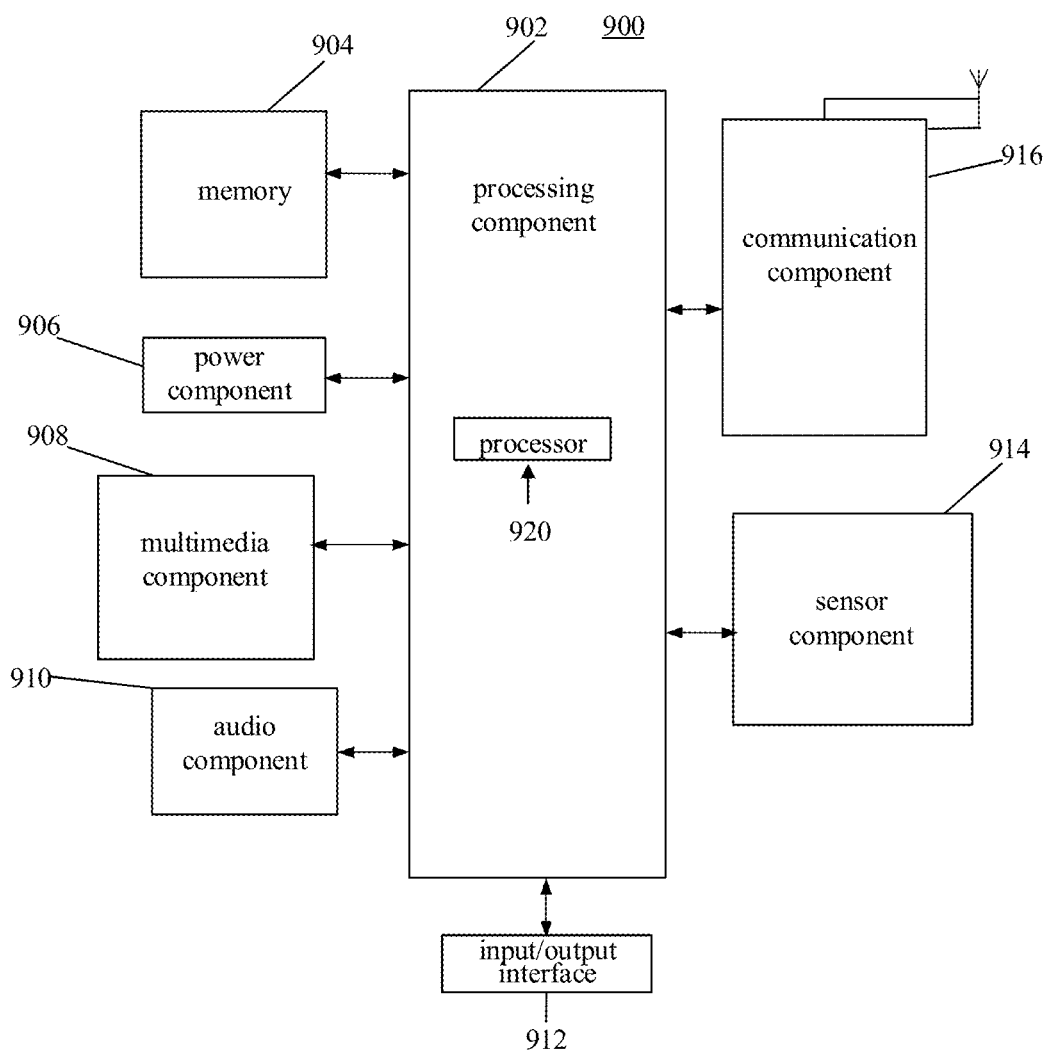
FIG. 10 is a block diagram illustrating an electronic device according to an example embodiment.

FIG. 10 is a block diagram illustrating an electronic device according to an example embodiment. For example, the electronic device 900 may be a mobile phone, a computer, a digital broadcast terminal, a messaging device, a game console, a tablet device, a personal digital assistant, and so on.

As illustrated in FIG. 10, the electronic device 900 may include one or more of the following components: a processing component 902, a memory 904, a power component 906, a multimedia component 908, an audio component 910, an input/output (I/O) interface 912, a sensor component 914, and a communication component 916.

The processing component 902 normally controls the overall operation (such as operations associated with displaying, telephone calls, data communications, camera operations and recording operations) of the electronic device 900. The processing component 902 may include one or more processors 920 to execute instructions so as to perform all or part of the blocks of the above described method. In addition, the processing component 902 may include one or more units to facilitate interactions between the processing component 902 and other components. For example, the processing component 902 may include a multimedia unit to facilitate interactions between the multimedia component 908 and the processing component 902.

The memory 904 is configured to store various types of data to support operations at the electronic device 900. Examples of such data include instructions of any application or method operated on the electronic device 900, contact data, phone book data, messages, images, videos and the like. The memory 904 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 906 provides power to various components of the electronic device 900. The power component 906 may include a power management system, one or more power sources and other components associated with power generation, management, and distribution of the electronic device 900.

The multimedia component 908 includes a screen that provides an output interface between the electronic device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may sense not only boundaries of the touch or sliding operation, but also the duration and pressure related to the touch or sliding operation. In some embodiments, the multimedia component 908 includes a front camera and/or a rear camera. When the electronic device 900 is in an operation mode such as a shooting mode or a video mode, the front camera and/or the rear camera may receive external multimedia data. Each of the front camera and the rear camera may be a fixed optical lens system or have a focal length and an optical zoom capability.

The audio component 910 is configured to output and/or input an audio signal. For example, the audio component 910 includes a microphone (MIC) that is configured to receive an external audio signal when the electronic device 900 is in an operation mode such as a call mode, a recording mode, and a voice recognition mode. The received audio signal may be further stored in the memory 904 or transmitted via the communication component 916. In some embodiments, the audio component 910 further includes a speaker for outputting the audio signal.

The I/O interface 912 provides an interface between the processing component 902 and a peripheral interface unit. The peripheral interface unit may be a keyboard, a click wheel, a button and so on. These buttons may include, but are not limited to, a home button, a volume button, a start button, and a locking button.

The sensor assembly 914 includes one or more sensors for providing the electronic device 900 with various aspects of status assessments. For example, the sensor component 914 may detect an ON/OFF state of the electronic device 900 and a relative positioning of the components. For example, the components may be a display and a keypad of the electronic device 900. The sensor component 914 may also detect a change in position of the electronic device 900 or a component of the electronic device 900, the presence or absence of contact of the user with the electronic device 900, the orientation or acceleration/deceleration of the electronic device 900 and a temperature change of the electronic device 900. The sensor component 914 may include a proximity sensor configured to detect the presence of nearby objects without any physical contact. The sensor component 914 may also include an optical sensor (such as a CMOS or a CCD image sensor) for use in imaging applications. In some embodiments, the sensor component 914 may further include an acceleration sensor, a gyro sensor, a magnetic sensor, a pressure sensor, or a temperature sensor.

The communication component 916 is configured to facilitate wired or wireless communication between the electronic device 900 and other devices. The electronic device 900 may access a wireless network based on a communication standard such as Wi-Fi, an operator network (such as 2G, 3G, 4G or 5G), or a combination thereof. In an example embodiment, the communication component 916 receives broadcast signals or broadcast-associated information from an external broadcast management system via a broadcast channel. In an example embodiment, the communication component 916 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In an example embodiment, the electronic device 900 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above method.

In an example embodiment, there is also provided a storage medium including instructions, such as a memory 904 including instructions. The instructions are executable by the processor 920 of the electronic device 900 to perform the above method. For example, the storage medium is non-transitory computer readable storage medium. In an example, the non-transitory computer readable storage medium may be a ROM, a random access memory (RAM), a CD-ROM, a magnetic tape, a floppy disk, an optical data storage device, and so on.

In an example embodiment, there is also provided a computer program product. The computer program product includes readable program codes. The readable program codes are executable by the processor 920 of the electronic device 900 to perform the above method for adding a special effect for a video. For example, the program codes may be stored in a storage medium of the electronic device 900. The storage medium is non-transitory computer readable storage medium. In an example, the non-transitory computer readable storage medium may be a ROM, a random access memory (RAM), a CD-ROM, a magnetic tape, a floppy disk, an optical data storage device, and so on.

Other embodiments of the present disclosure will be apparent to those skilled in the art after considering the description and practicing the present disclosure disclosed herein. The present disclosure is intended to cover any variations, uses or adaptive changes of the present disclosure. These variations, uses or adaptive changes are in accordance with general principles of the present disclosure and include common knowledge or technical means in the art that are not disclosed herein. The description and embodiments are to be regarded as illustrative only, and the real scope and spirit of the present disclosure are pointed out in the attached claims.

It should be understood that the present disclosure is not limited to the precise structures described above and illustrated in the drawings, and various modifications and changes may be made without departing from the scope thereof. The scope of the present disclosure is merely limited by the attached claims.

What is claimed is:

1. A method for adding a special effect to a video, comprising:
    obtaining a portrait foreground of a current frame contained in a video to be added with a special effect by separating the portrait foreground from a background of the current frame;
    determining portrait edge information of the current frame based on the portrait foreground of the current frame and the portrait foreground of a previous frame;
    obtaining a two-dimensional fluctuation offset corresponding to each pixel by determining a fluctuation offset of an abscissa and a fluctuation offset of an ordinate corresponding to each pixel of the portrait edge information based on a playback time of the current frame in the video to be added with the special effect, a preset amplitude factor, a preset temporal frequency factor, and a preset spatial coordinate factor, and
    adding the two-dimensional fluctuation offset to the portrait edge information; obtaining the current frame added with the special effect by superimposing the current frame of the video and the portrait edge information added with the two-dimensional fluctuation offset.

2. The method of claim 1, before obtaining a two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor, and adding the two-dimensional fluctuation offset to the portrait edge information, further comprising:
  adding a mask to a face contained in the portrait edge information.

3. The method of claim 2, wherein said adding the mask to the face contained in the portrait edge information comprises:
  determining a center point of the face by performing face recognition on the portrait foreground;
  determining an attenuation matrix as the mask based on a distance from each pixel contained in the portrait foreground to the center point of the face; and
  obtaining the portrait edge information added with a facial mask by multiplying the attenuation matrix and the portrait edge information.

4. The method of claim 3, wherein said determining the center point of the face by performing face recognition on the portrait foreground comprises:
  determining centers of eyes by performing the face recognition on the portrait foreground; and
  determining a midpoint of a connecting line between the centers of the eyes as the center point of the face.

5. The method of claim 3, wherein said determining the attenuation matrix as the mask based on the distance from each pixel contained in the portrait foreground to the center point of the face comprises:
  determining the attenuation matrix as the mask based on the distance from each pixel contained in the portrait foreground to the center point of the face according to a formula of:

$$C(x,y)=e^{-\alpha L},$$

where (x, y) represents a coordinate of a pixel contained in the portrait foreground, C(x, y) represents an attenuation value corresponding to the coordinate (x, y), L represents the distance from a point having the coordinate (x, y) to the center point of the face, and a represents a preset attenuation coefficient.

6. The method of claim 1, wherein said obtaining the two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor comprises:
  obtaining the two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor, according to formulas of:

$$\Delta x = A(\sin(\omega t)\sin(kx) + \cos(\omega t)\sin(ky)),$$

$$\Delta y = A(\sin(\omega t)\sin(ky) + \cos(\omega t)\sin(kx)),$$

where A represents the preset amplitude factor, ω represents the preset temporal frequency factor, k represents the preset spatial coordinate factor, t represents the playback time, x represents the abscissa of the pixel, y represents the ordinate of the pixel, $\Delta x$ represents the fluctuation offset of the abscissa of the pixel, and $\Delta y$ represents the fluctuation offset of the ordinate of the pixel.

7. The method of claim 1, before superimposing the current frame of the video and the portrait edge information added with the two-dimensional fluctuation offset, further comprising:
  determining an interpolation coefficient corresponding to a color change based on the playback time and a trigonometric function related to the playback time;
  determining an output color corresponding to a preset number of input colors based on the interpolation coefficient; and
  interpolating the output color into the portrait edge information added with the fluctuation offset.

8. The method of claim 7, wherein said determining the interpolation coefficient corresponding to the color change based on the playback time and the trigonometric function related to the playback time comprises:
  determining the interpolation coefficient based on the playback time and the trigonometric function related to the playback time, according to a formula of:

$$r=\sin(vt),$$

where r represents the interpolation coefficient, v represents a preset speed of the color change, and t represents the playback time; and
  wherein said determining the output color corresponding to the preset number of preset input colors based on interpolation coefficient, according to a formula, comprises:

$$COL_{out}=[COL1*r+COL2*(1-r)]*r+COL3*(1-r),$$

where $COL_{out}$ represents the output color, and COL1, COL2 and COL3 are three input colors.

9. The method of claim 7, further comprising:
  performing attenuation processing on color and transparency of the portrait edge information of the previous frame based on a preset color attenuation coefficient and a preset transparency attenuation coefficient; and
  superimposing with the portrait edge information of the current frame.

10. The method of claim 1, after obtaining the current frame added with the special effect, further comprising:
  performing circularly operations for adding the special effect to the current frame, until all frames contained in the video are processed to obtain the video added with the special effect.

11. A non-transitory computer-readable storage medium, wherein when instructions stored in the storage medium are executed by a processor of an electronic device, the electronic device is caused to execute a method for adding a special effect to a video comprising:
  obtaining a portrait foreground of a current frame contained in a video to be added with a special effect by separating the portrait foreground from a background of the current frame;

determining portrait edge information of the current frame based on the portrait foreground of the current frame and the portrait foreground of a previous frame;

obtaining a two-dimensional fluctuation offset corresponding to each pixel by determining a fluctuation offset of an abscissa and a fluctuation offset of an ordinate corresponding to each pixel of the portrait edge information based on a playback time of the current frame in the video to be added with the special effect, a preset amplitude factor, a preset temporal frequency factor, and a preset spatial coordinate factor, and adding the two-dimensional fluctuation offset to the portrait edge information;

obtaining the current frame added with the special effect by superimposing the current frame of the video and the portrait edge information added with the two-dimensional fluctuation offset.

12. An electronic device, comprising:
a processor; and
a memory, configured to store instructions executable by the processor;
wherein the processor is configured to execute the instructions to execute a method for adding a special effect to a video comprising:
obtaining a portrait foreground of a current frame contained in a video to be added with a special effect by separating the portrait foreground from a background of the current frame;

determining portrait edge information of the current frame based on the portrait foreground of the current frame and the portrait foreground of a previous frame;

obtaining a two-dimensional fluctuation offset corresponding to each pixel by determining a fluctuation offset of an abscissa and a fluctuation offset of an ordinate corresponding to each pixel of the portrait edge information based on a playback time of the current frame in the video to be added with the special effect, a preset amplitude factor, a preset temporal frequency factor, and a preset spatial coordinate factor, and adding the two-dimensional fluctuation offset to the portrait edge information;

obtaining the current frame added with the special effect by superimposing the current frame of the video and the portrait edge information added with the two-dimensional fluctuation offset.

13. The electronic device of claim 12, wherein before obtaining a two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor, and adding the two-dimensional fluctuation offset to the portrait edge information, the method further comprises:
adding a mask to a face contained in the portrait edge information.

14. The electronic device of claim 13, wherein said adding the mask to the face contained in the portrait edge information comprises:
determining a center point of the face by performing face recognition on the portrait foreground;
determining an attenuation matrix as the mask based on a distance from each pixel contained in the portrait foreground to the center point of the face; and obtaining the portrait edge information added with a facial mask by multiplying the attenuation matrix and the portrait edge information.

15. The electronic device of claim 14, wherein said determining the center point of the face by performing face recognition on the portrait foreground comprises:
determining centers of eyes by performing the face recognition on the portrait foreground; and
determining a midpoint of a connecting line between the centers of the eyes as the center point of the face.

16. The electronic device of claim 14, wherein said determining the attenuation matrix as the mask based on the distance from each pixel contained in the portrait foreground to the center point of the face comprises:
determining the attenuation matrix as the mask based on the distance from each pixel contained in the portrait foreground to the center point of the face according to a formula of:

$$C(x,y)=e^{-\alpha L},$$

where (x, y) represents a coordinate of a pixel contained in the portrait foreground, C(x, y) represents an attenuation value corresponding to the coordinate (x, y), L represents the distance from a point having the coordinate (x, y) to the center point of the face, and a represents a preset attenuation coefficient.

17. The electronic device of claim 12, wherein said obtaining the two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor comprises:
obtaining the two-dimensional fluctuation offset corresponding to each pixel by determining the fluctuation offset of the abscissa and the fluctuation offset of the ordinate corresponding to each pixel of the portrait edge information based on the playback time of the current frame in the video to be added with the special effect, the preset amplitude factor, the preset temporal frequency factor, and the preset spatial coordinate factor, according to formulas of:

$$\Delta x = A(\sin(\omega t)\sin(kx)+\cos(\omega t)\sin(ky)),$$

$$\Delta y = A(\sin(\omega t)\sin(ky)+\cos(\omega t)\sin(kx)),$$

where A represents the preset amplitude factor, ω represents the preset temporal frequency factor, k represents the preset spatial coordinate factor, t represents the playback time, x represents the abscissa of the pixel, y represents the ordinate of the pixel, Δx represents the fluctuation offset of the abscissa of the pixel, and Δy represents the fluctuation offset of the ordinate of the pixel.

18. The electronic device of claim 12, wherein, before superimposing the current frame of the video and the portrait edge information added with the two-dimensional fluctuation offset, the method further comprises:
determining an interpolation coefficient corresponding to a color change based on the playback time and a trigonometric function related to the playback time;
determining an output color corresponding to a preset number of input colors based on the interpolation coefficient; and interpolating the output color into the portrait edge information added with the fluctuation offset.

19. The electronic device of claim 18, wherein said determining the interpolation coefficient corresponding to the color change based on the playback time and the trigonometric function related to the playback time comprises:

determining the interpolation coefficient based on the playback time and the trigonometric function related to the playback time, according to a formula of:

$$r=\sin(vt),$$

where r represents the interpolation coefficient, v represents a preset speed of the color change, and t represents the playback time; and wherein said determining the output color corresponding to the preset number of preset input colors based on interpolation coefficient, according to a formula, comprises:

$$COL_{out}=[COL1*r+COL2*(1-r)]*r+COL3*(1-r),$$

where $COL_{out}$ represents the output color, and COL1, COL2 and COL3 are three input colors.

20. The electronic device of claim 18, wherein the method further comprises:

performing attenuation processing on color and transparency of the portrait edge information of the previous frame based on a preset color attenuation coefficient and a preset transparency attenuation coefficient; and superimposing with the portrait edge information of the current frame.

* * * * *